(12) United States Patent
Tankard

(10) Patent No.: US 6,759,826 B2
(45) Date of Patent: Jul. 6, 2004

(54) CONTROL STRATEGY FOR SWITCHED RELUCTANCE DRIVE SYSTEMS

(75) Inventor: Michael Paul Tankard, Harrogate (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 10/163,945

(22) Filed: Jun. 5, 2002

(65) Prior Publication Data

US 2002/0190684 A1 Dec. 19, 2002

(30) Foreign Application Priority Data

Jun. 14, 2001 (GB) .............................................. 0114531

(51) Int. Cl.$^7$ .............................. H02P 7/36; H02P 5/28
(52) U.S. Cl. ...................... 318/701; 318/700; 318/690; 318/696
(58) Field of Search ................................ 318/700, 701, 318/690, 696, 254

(56) References Cited

U.S. PATENT DOCUMENTS

| 4,739,240 A | * | 4/1988 | MacMinn et al. ........... 318/696 |
| 4,933,621 A | | 6/1990 | MacMinn et al. .......... 318/696 |
| 5,097,191 A | * | 3/1992 | Bahn ........................... 318/701 |
| 5,166,591 A | * | 11/1992 | Stephens et al. ............ 318/701 |
| 5,446,359 A | * | 8/1995 | Horst ........................... 318/701 |
| 5,530,333 A | * | 6/1996 | Turner ......................... 318/701 |
| 5,532,567 A | * | 7/1996 | Iwasaki et al. ............. 318/701 |
| 5,760,565 A | | 6/1998 | Randall ........................ 318/701 |
| 5,923,141 A | * | 7/1999 | McHugh ...................... 318/701 |
| 5,942,865 A | | 8/1999 | Kim ............................. 318/254 |
| 5,973,462 A | | 10/1999 | Kalpathi et al. |
| 6,002,222 A | * | 12/1999 | Turner ......................... 318/254 |
| 6,014,002 A | * | 1/2000 | Guinet ......................... 318/701 |
| 6,049,181 A | * | 4/2000 | Kolomeitsev ................ 318/254 |
| 6,198,239 B1 | * | 3/2001 | Blackburn ................... 318/254 |
| 6,201,368 B1 | * | 3/2001 | Webster ....................... 318/729 |
| 6,297,613 B1 | * | 10/2001 | Elliott et al. ................ 318/701 |
| 6,498,447 B2 | * | 12/2002 | Mann et al. ................. 318/254 |
| 2002/0075621 A1 | * | 6/2002 | Elliott ......................... 361/111 |

FOREIGN PATENT DOCUMENTS

| DE | 19939933 A1 | 4/2000 | |
| EP | 0700594 B1 | 3/1996 | ............. H02P/6/00 |
| WO | WO 90/16111 | 12/1990 | ............. H02P/6/02 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21–24, 1993, pp. 1–68.

* cited by examiner

Primary Examiner—Kimberly Lockett
Assistant Examiner—Patrick Miller
(74) Attorney, Agent, or Firm—Dicke, Billig & Czaja, PLLC

(57) ABSTRACT

A switched reluctance drive is supplied from a power source and has a DC link, across which is a DC link capacitor. The phases of the machine are controlled by a controller which controls the switches connecting each phase winding to the DC link. The controller switches off the switches of each phase in a sequence which minimizes the peak voltage appearing on the DC link capacitor, thereby allowing a reduction in the voltage rating of the capacitor.

21 Claims, 6 Drawing Sheets

CONTROL STRATEGY FOR SWITCHED RELUCTANCE DRIVE SYSTEMS

CROSS REFERENCE TO RELATED APPLICATION

The subject matter of this application is related to the subject matter of British Application No. 0114531.7, filed Jun. 14, 2001, priority to which is claimed under 35 U.S.C. §119 and which is incorporated herein by reference.

BACKGROUND OF THE INVENTION

1. Field of the Invention

This invention relates to a method of reducing transient voltages in switched reluctance drive systems.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, Jun. 21–24, 1993, incorporated herein by reference. FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. The rotor position detector 15 may take many forms, including that of a software algorithm. Its output may also be used to generate a speed feedback signal. Current feedback is provided by a current transducer 17 for the or each phase winding. As discussed in the Stephenson paper cited above, reluctance machines can be operated in either a motoring or a generating mode. The input demand 18 can be a torque or speed demand for motoring or a current or voltage demand for generating.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. The cost and/or size of this capacitor is important in installations which are sensitive to drive cost and/or the space occupied by the drive, for example in aerospace or automotive applications.

The switched reluctance drive is essentially a variable speed system and is characterized by voltages and currents in the phase windings of the machine which are quite different from those found in traditional types of machines fed with an alternating current. As is well known, there are two basic modes of operation of switched reluctance systems: single-pulse mode and chopping mode, both of which are described in the Stephenson paper cited above. These are briefly described here as follows.

At a predetermined rotor angle, voltage is applied to the phase winding by switching on the switches in the power converter 13 and applying constant voltage for a given angle $\theta_c$, the conduction angle. When $\theta_c$, has been traversed, the switches are opened and the action of energy return diodes places a negative voltage across the winding, causing the flux in the machine, and hence the current, to decay to zero. There is then typically a period of zero current until the cycle is repeated. It will be clear that the phase is drawing energy from the supply during $\theta_c$ and returning a smaller amount to the supply thereafter. This is shown in FIG. 3(a). This mode is generally known as the single-pulse mode because there is only one pulse of voltage applied to the phase in a phase period. Single-pulse mode is normally used for the medium and high speeds in the speed range of a typical drive. Instead of opening both switches simultaneously, there are circumstances in which it is advantageous to open the second switch an angle $\theta_f$ later than the first, allowing the current to circulate around the loop formed by the closed switch, the phase winding and a diode. This technique is known as "freewheeling" and is used for various reasons, including peak current limitation and acoustic noise reduction. The inclusion of freewheeling is shown in FIG. 3(b). Freewheeling can be used over a broad speed range. The timing of the initiation of freewheeling and its period are speed dependent.

At zero and low speeds, however, the single-pulse mode is not suitable, due to the high peak currents which would be experienced, and the chopping mode is used, in which the peak current is limited to some predetermined value during the overall period of conduction. As for single-pulse control, there are two principal variants of the chopping mode. The simplest method is to open simultaneously the two switches associated with a phase winding, e.g. switches 21 and 22 in FIG. 2. This causes energy to be returned from the machine to the DC link and is sometimes known as "hard chopping". With any chopping scheme, there is a choice of strategy for determining the current levels to be used. Many such strategies are known in the art. One scheme uses a hysteresis controller which enables chopping between upper and lower current levels. A typical scheme is shown in FIG. 4(a) for hard chopping. At a chosen switch-on angle $\theta_{on}$ (which is often the position at which the phase has minimum inductance, but may be some other position), the voltage is applied to the phase winding and the phase current is allowed to rise until it reaches the upper hysteresis current $I_u$. At this point both switches are opened and the current falls until it reaches the lower current $I_1$ and the switches are closed again, repeating the chopping cycle. An alternative method is to open only one of the switches and allow freewheeling to occur and is known as "freewheel chopping" or "soft chopping". FIG. 4(b) shows the phase current waveform for a hysteresis controller using freewheeling or soft chopping.

U.S. Pat. No. 4,933,621 (MacMinn), incorporated herein by reference, proposes the use of freewheeling chopping to reduce the switching device losses by reducing the switching frequency, and to reduce the ripple current rating of the capacitor. U.S. Pat. No. 5,942,865 (Kim), incorporated herein by reference, describes a system for freewheeling at the end of a series of PWM pulses, the delay time being selected to reduce the radial forces on the stator and hence reduce the emitted acoustic noise. A similar approach is described in EP 700945 (Wu), incorporated herein by reference, where the freewheeling period is selected in relation to the resonant frequency of the stator, the intention being to actively cancel the vibration of the stator with a counteracting pulse of equal magnitude. Use of much longer periods of freewheeling has been proposed by WO 90/16111 (Hedlund) and U.S. Pat. No. 5,760,565 (Randall), both incorporated herein by reference, in order to reduce the peak flux and hence reduce the associated iron loss at high speeds.

None of the prior art discusses the use of freewheeling to reduce the voltage rating of the DC link capacitor. The cost of the capacitor is influenced by a number of requirements, e.g., operating temperature, life requirement, ripple current rating, internal impedance, etc., but one of the most important is the voltage rating. This rating is determined not by the nominal value of the DC link, but by the transient voltages appearing on that link and the requirement to have a safety margin above the highest expected transient. Particularly in low-voltage systems operating from 24V or 48V batteries, the cost of the capacitor is very dependent on the transient voltage specification.

SUMMARY OF THE INVENTION

According to embodiments of the invention, there is provided a method of reducing the magnitude of transient voltages in a switched reluctance drive system which comprises a reluctance machine having a stator with at least one phase winding and a moving part which is movable in relation to the stator, switch means connected across the or each phase winding which are configurable into an energizing mode in which the phase winding is energized through the switch means from a supply for a phase conduction period, a freewheeling mode in which there is no applied voltage and current in the winding recirculates, and a de-energizing mode in which the voltage across the at least one phase winding is reversed, and a DC link capacitor connected across the supply side of the switch means, the method comprising: initiating the energizing mode at the beginning of the phase conduction period of the at least one phase winding; initiating the freewheeling mode, causing a first transient voltage spike across the capacitor; and initiating the de-energizing mode a predetermined period after initiating the freewheeling mode, causing a second transient voltage spike across the capacitor.

It is generally conventional thinking that the switching times in a switched reluctance drive should be as short as possible. This is clearly particularly acute at high speeds. To introduce a freewheeling step to reduce the transient voltage is essentially in conflict with this understanding. The choice of predetermined time between initiating the freewheeling and the de-energizing modes is preferably traded off against the time taken for the overall switching operation. It will be appreciated that the time available for the switching operation decreases as machine speed increases. Up to now the opportunity to use a freewheeling step in order to ease the transient voltage burden on the DC link capacitor has not been recognized.

The magnitude of the second transient voltage spike will depend, in part, on the extent of decay of the voltage across the DC link capacitor. According to a preferred form of the invention, the point at which de-energizing mode is entered is chosen not to be above or to coincide with the point in the DC link voltage decay at which the addition of the second voltage spike will not exceed the first spike. This represents a trade-off between the magnitude of the spikes and the time between switching from freewheeling to de-energizing.

According to an embodiment of the invention, the predetermined period is fixed according to the decay of the first transient voltage spike.

According to a particular form of the invention there is provided a method of reducing the magnitude of transient voltages in a switched reluctance drive system which comprises a reluctance machine having a stator with at least one phase winding and a moving part which is movable in relation to the stator, switch means connected across the or each phase winding which are configurable into an energizing mode in which the phase winding is energized through the switch means from a supply for a phase conduction period, a freewheeling mode in which there is no applied voltage and the current in the winding recirculates as the voltage across the winding decays, and a de-energizing mode in which the voltage across the at least one phase winding is reversed, and a DC link capacitor connected across the supply side of the switch means, the method comprising: initiating the energizing mode at the beginning of the phase conduction period of the at least one phase winding; initiating the freewheeling mode, causing a first transient voltage spike across the capacitor; initiating the de-energizing mode after initiating the freewheeling mode, causing a second transient voltage spike across the capacitor, and adjusting the period between the first and second transient voltage spikes to balance the magnitude of the second transient voltage spike against the time taken to de-energize the winding.

BRIEF DESCRIPTION OF THE DRAWINGS

The present invention can be put into practice in various ways, some of which will now be described by way of example with reference to the accompanying drawings, in which:

FIG. 3($b$) shows the waveforms of voltage, and phase current for the known single-pulse mode of operation with freewheeling;

FIG. 4($b$) shows the phase current for the known freewheel chopping mode of operation;

FIG. 5($b$) shows the waveform of DC link voltage for a practical circuit;

FIG. 6($b$) shows the waveform of DC link voltage for a circuit operated according to an embodiment of the invention.

DETAILED DESCRIPTION OF PREFERRED EMBODIMENTS

Figure 1:
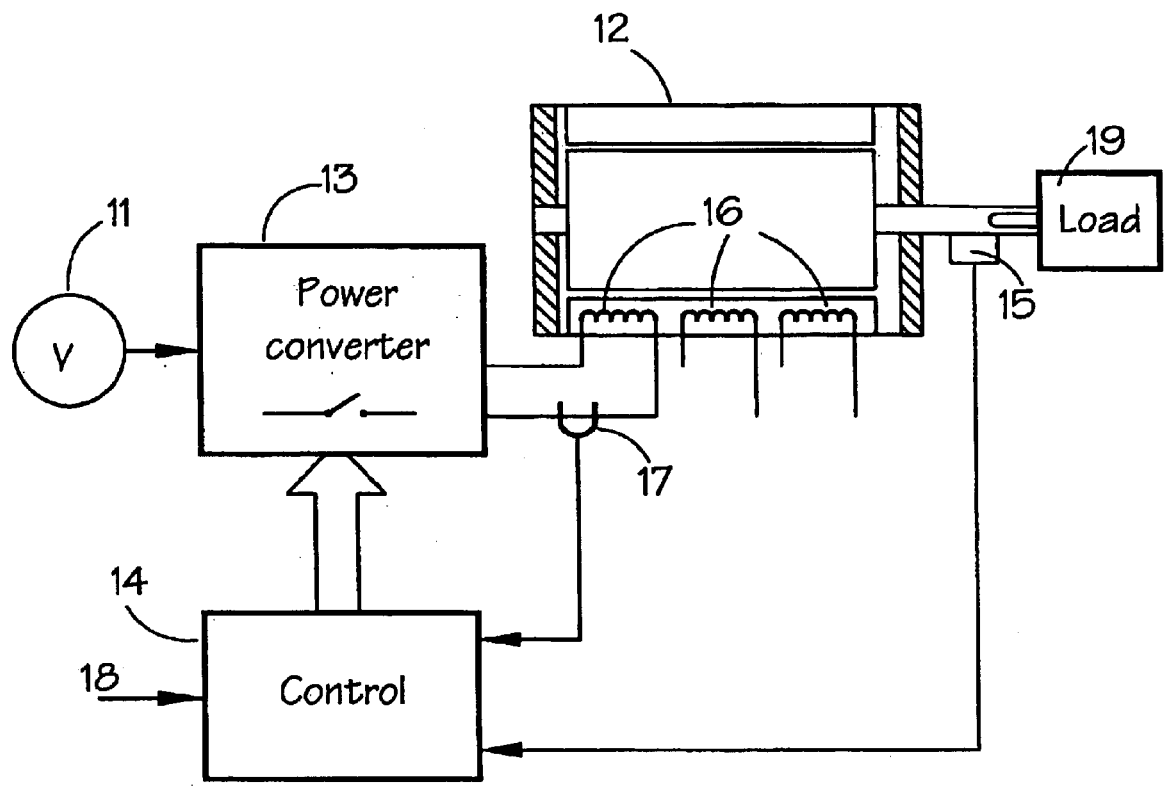
FIG. 1 shows a schematic diagram of a known switched reluctance system.
Figure 2:
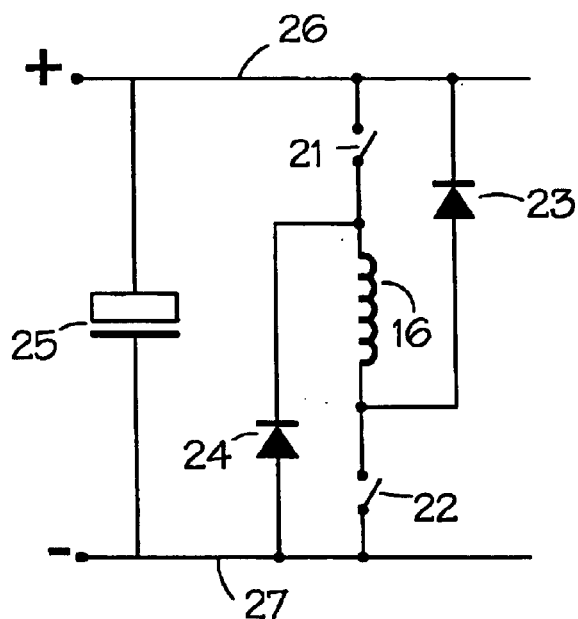
FIG. 2 shows the known connection of one phase winding to the power convener.

The invention is implemented in a first embodiment in a drive system such as that shown in FIG. 1 with switching circuits for each of the phases as shown in FIG. 2. According to embodiments of the invention, the control strategy is adapted to exploit the freewheeling configuration of the switching circuit by programming of the controller 14.

Figure 3A:
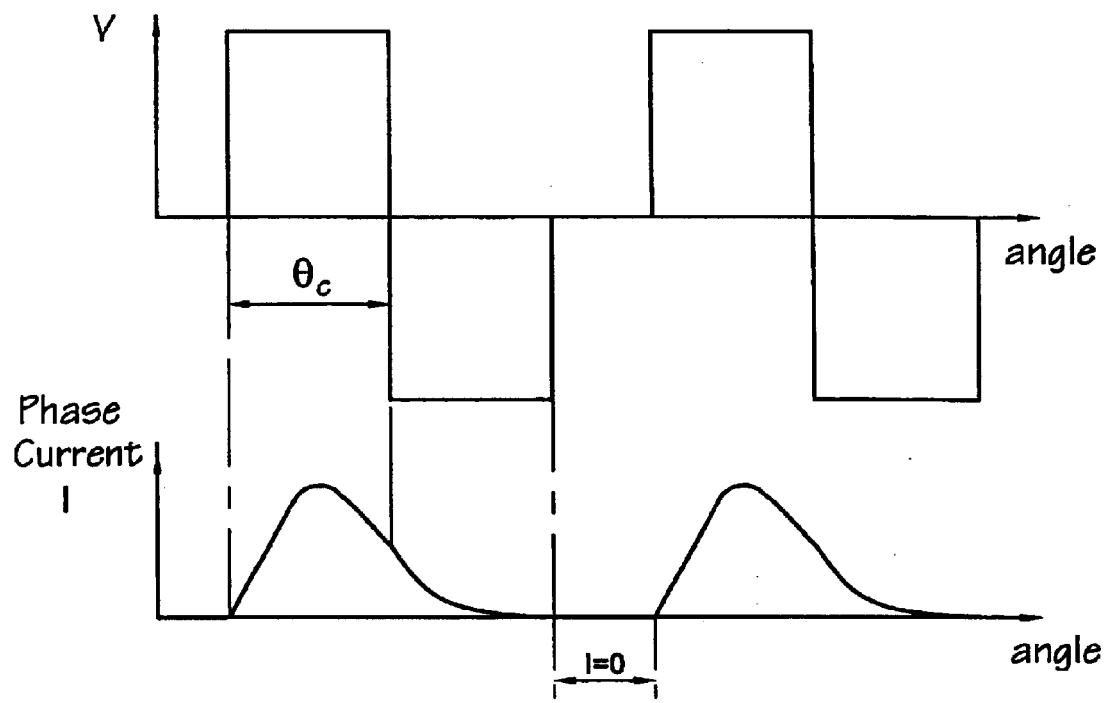
FIG. 3($a$) shows the waveforms of voltage, and phase current for the known single-pulse mode of operation without freewheeling.
Figure 3B:
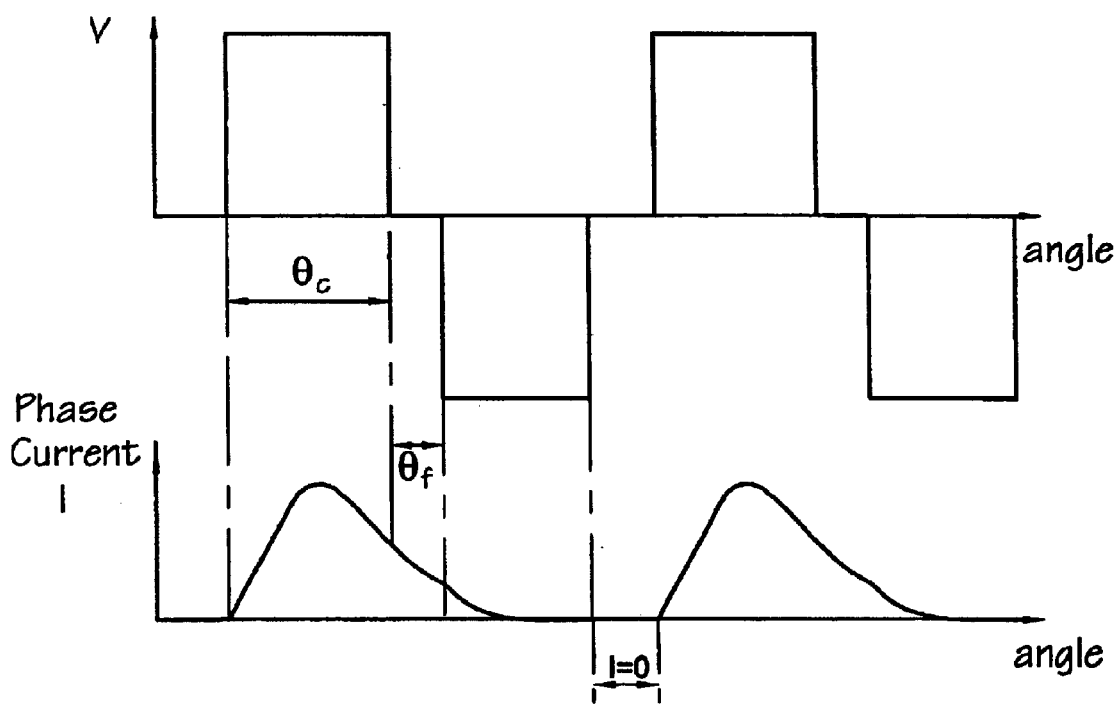
Figure 4A:
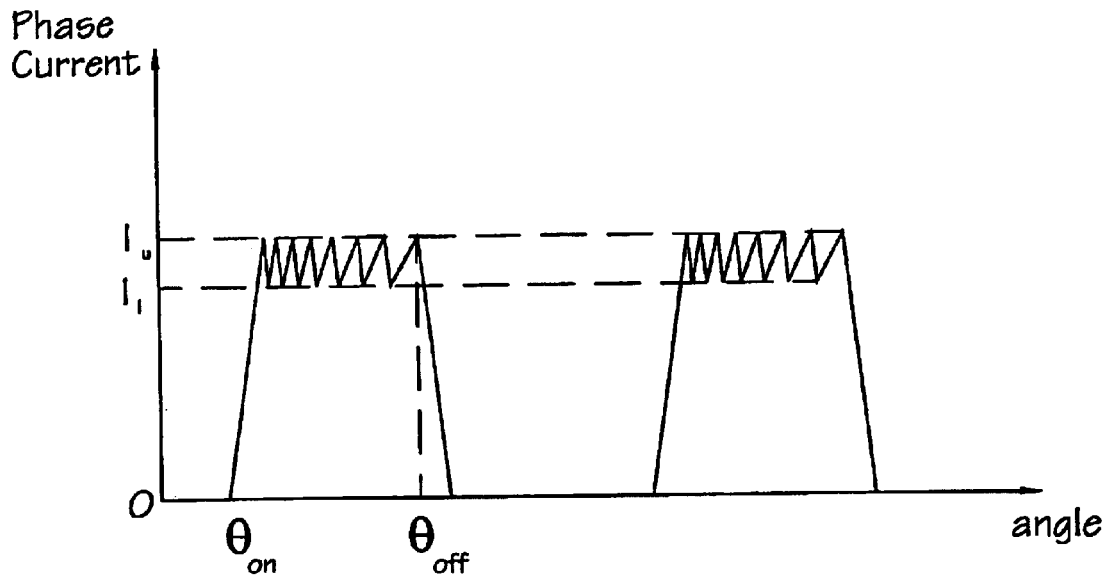
FIG. 4($a$) shows the phase current for the known hard chopping mode of operation.
Figure 4B:
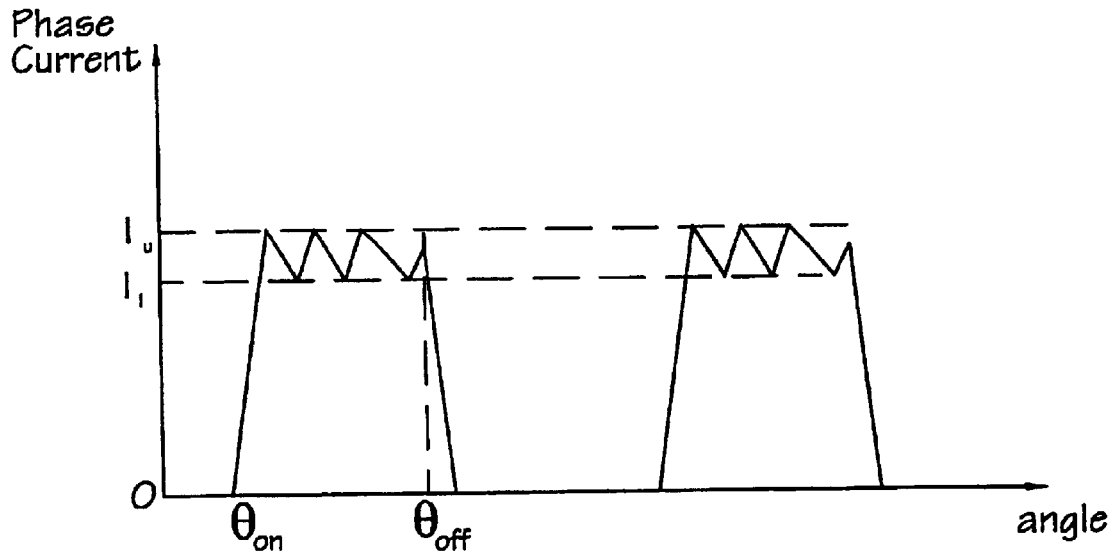
Figure 5A:
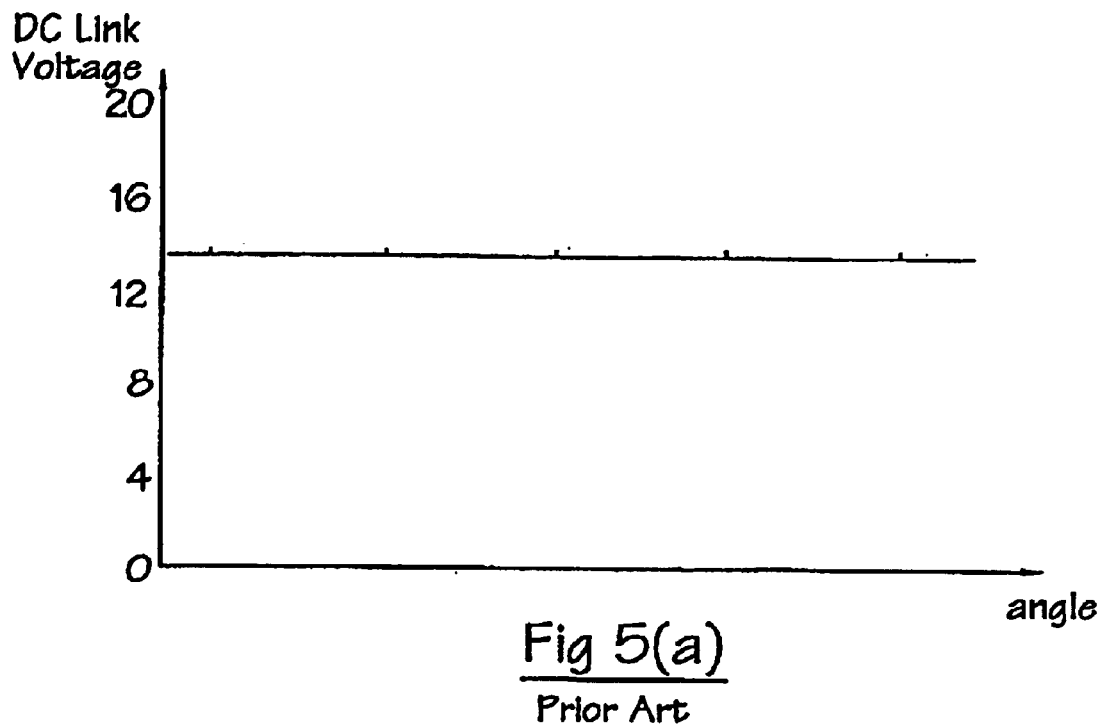
FIG. 5($a$) shows the waveform of DC link voltage for an ideal circuit.

FIG. 5(a) shows the waveform of voltage at the terminals of the DC link capacitor 25 (i.e. the DC link voltage) when one phase of the circuit of FIG. 2 is operated in the conventional way to produce the phase current waveform of FIG. 3(a). This graph is drawn for the conditions where the voltage source 11 and the DC link capacitor are ideal in that they have minimal inductance. It is seen that the DC link voltage is virtually constant, with very small spikes of short duration at the points where the phase is switched off.

Figure 5B:
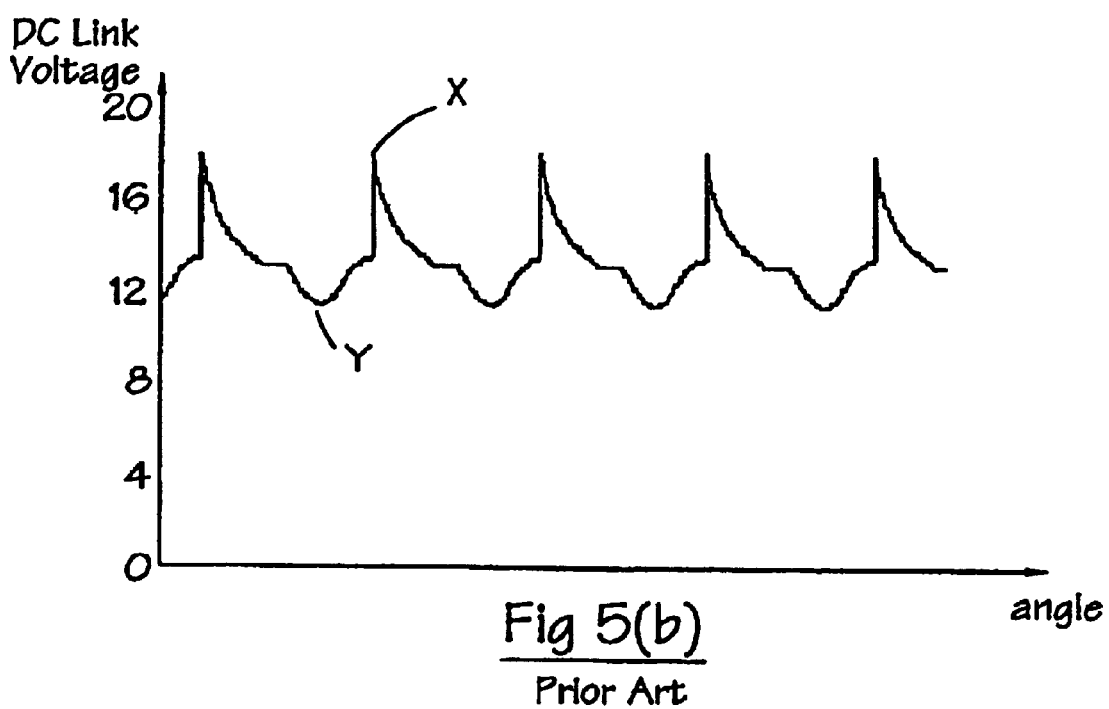

In a practical circuit, however, the source will have both resistance and inductance, and the capacitor and its connecting leads will also have some parasitic inductance. The combined effect of these inductances is to cause a sudden rise in the DC link voltage when the switching devices 21, 22 are opened. This is shown in FIG. 5(b), where the transient voltage rises to 136% of the nominal DC link voltage when the switches are opened at point X. The droop in the voltage curve over region Y of the graph is the regulation caused by the phase current flowing through the source impedance.

Figure 6A:
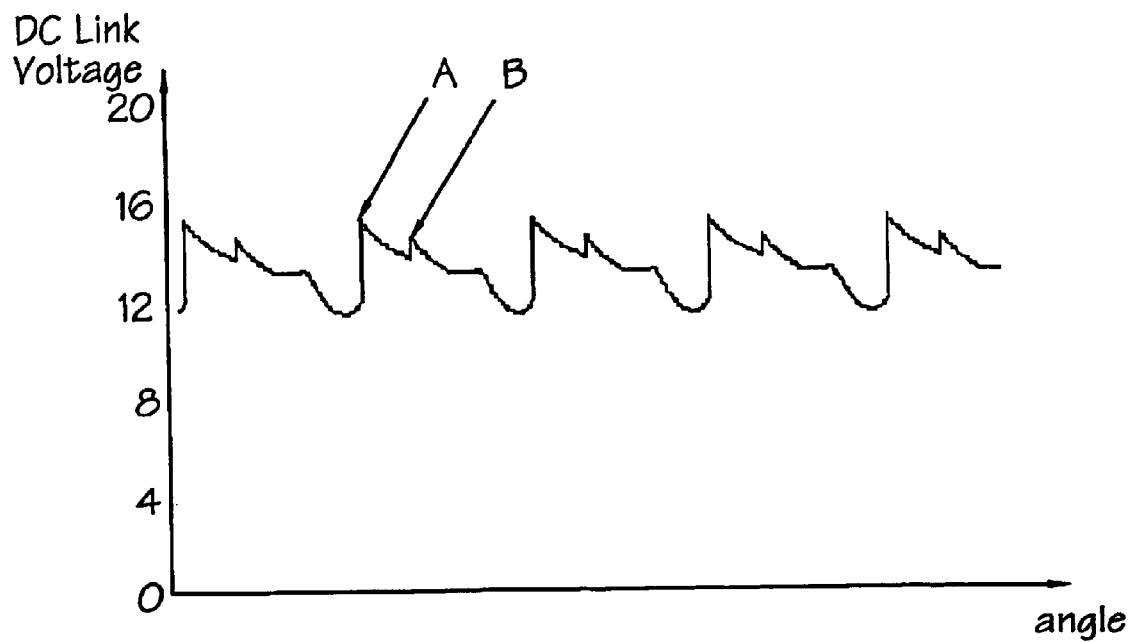
FIG. 6($a$) shows the waveform of DC link voltage for a circuit operated according to one aspect of the invention.

According to embodiments of the invention, the transient voltage is reduced by freewheeling for a very short period of time, the period being related to the width of the transient voltage pulse produced by switching off the first of the switches. In FIG. 6(a) the nominal supply voltage is 13.5V and the parameters of the supply, capacitor, switches and the winding are the same as for FIG. 5. The first voltage spike, marked A, is due to the first switch 21 opening to freewheel the phase so that the current in the winding 16 recirculates and relatively gradually decays. The second voltage spike, marked B, is due to the second switch 22 opening to de-energize the winding, driving down the flux and hence the phase current. The second spike B is smaller than the first because the phase winding current has decayed in the interval between the pulses as it freewheels, so the smaller current produces a smaller spike. It will be seen that the voltage overshoot is now reduced to 116%, i.e., approximately half that produced by the conventional operation.

Figure 6B:
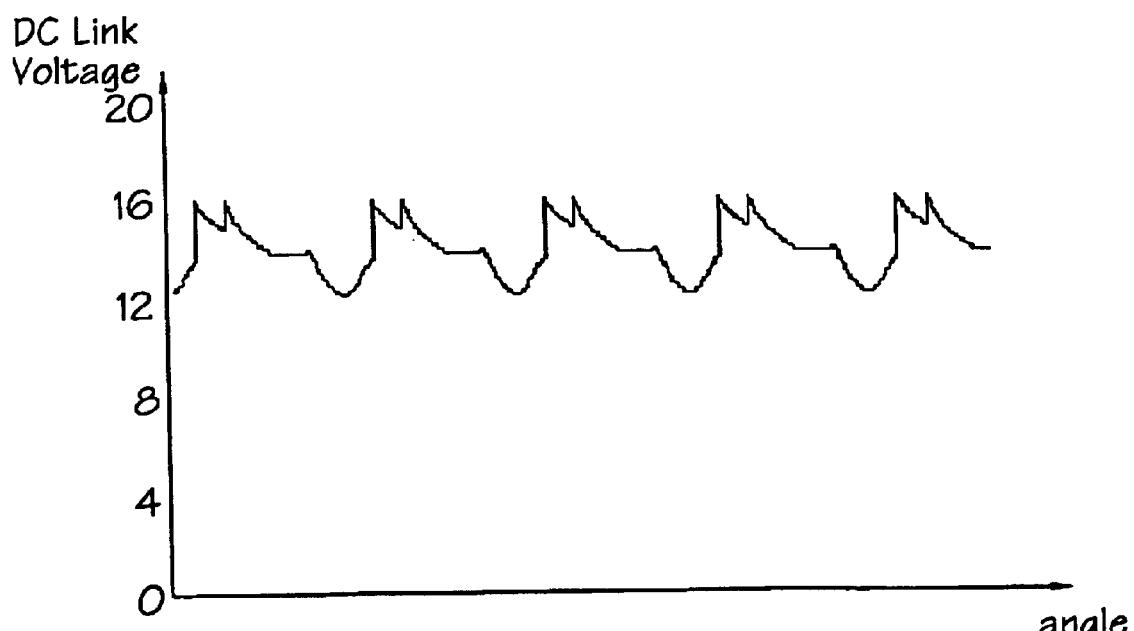

According to an alternative embodiment of the invention, the second switch 22 is opened at a pre-determined time after the first switch 21, such that the addition of the decaying first spike and the second, smaller, spike at the point at which winding de-energization is initiated is substantially equal to the peak of the first pulse. This is shown in FIG. 6(b), where the two peaks in the waveform are substantially equal. For the component values used above and a six stator pole/four rotor pole switched reluctance machine, the time between switch actuations is 36 µsec. This is the condition where the transient voltage on the capacitor is kept as low as possible and the entire switching operation is completed in as short a period as possible. Embodiments of the invention impose an extra switching step. This is in conflict with the basic desideratum of rapid switching. However, the timing of the two steps is close enough for it not to have any significant deleterious effect on the overall switching. Note that the delay is fixed for any drive and is independent of the speed of the drive or of the control laws being used to control the drive. In some circumstances it may not be possible for the predetermined time between switching steps to be made long enough for the voltage to decay sufficiently for the voltage spikes to be of equal magnitude. In this case, the second transient voltage spike exceeding the first will still represent an easing of the transient voltage spike burden on the DC link capacitor as the energy is still distributed over the two steps.

Figure 7:
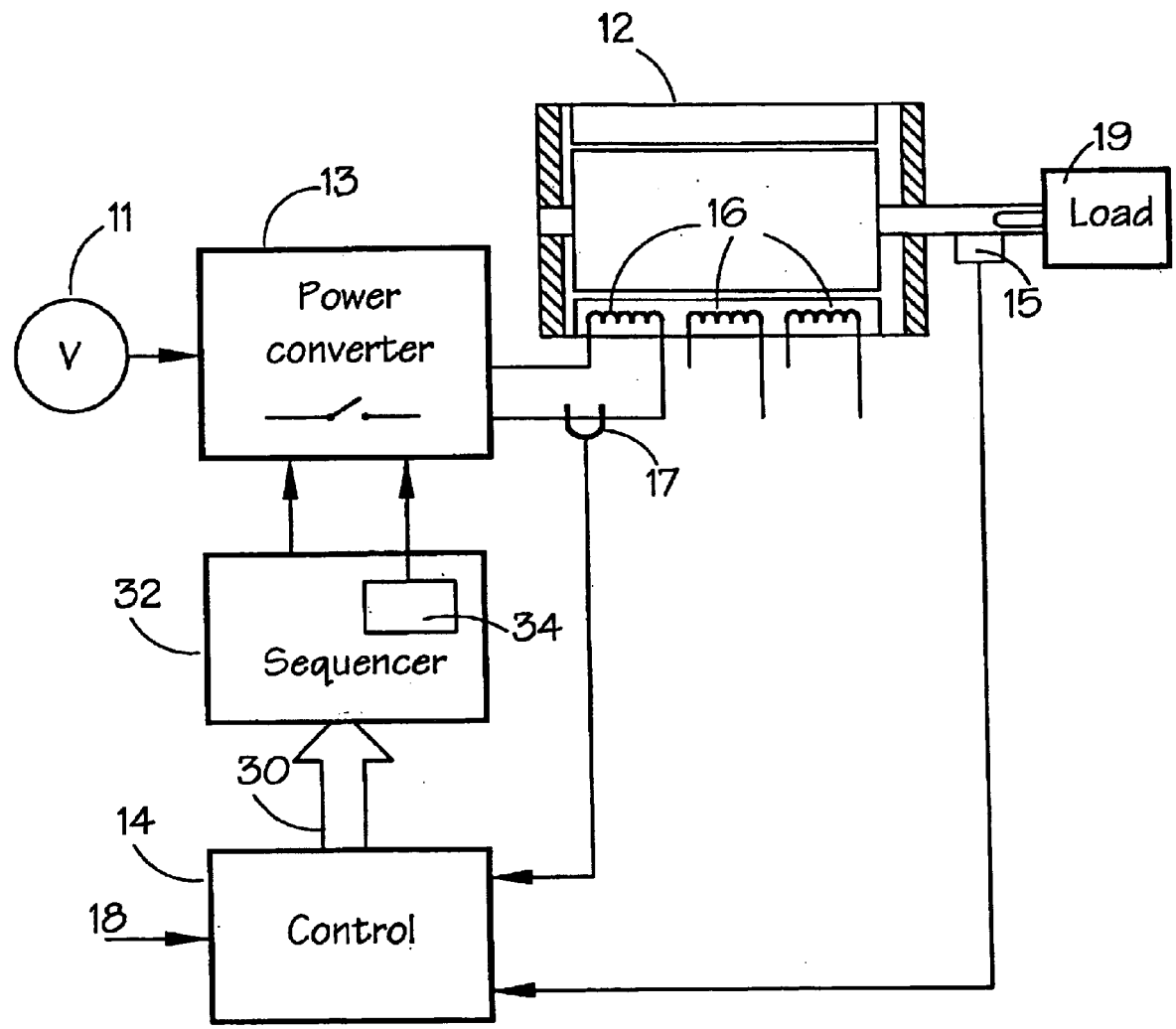
FIG. 7 shows a modified circuit for carrying out the invention.

The controller 14 can be implemented in different forms. Typically it is a programmable or dedicated device, such as an application-specific integrated circuit (ASIC). The timing of the switching is part of the programming. To arrange for a two-step switching operation requires basic reprogramming of the device as would be appreciated by the skilled person. Alternatively, the timing can be effected by an extra counter circuit as shown in FIG. 7. In this embodiment the controller 14 is arranged to produce control signals 30 based on the information fed back from the current transducer 17 and the rpt 15, and the input demand 18. The control signals 30 are received by a sequencer 32 that firstly immediately initiates the freewheel mode of the converter 13 by opening one of the switches 21/22. At the same time a counter 34 is started which cycles for the predetermined time (e.g. 36 µs) before the de-energizing configuration of the converter 13 is entered by opening the remaining switch. The counter 34 is then zeroed in readiness for the next phase or the next cycle of the single phase.

The waveforms of FIGS. 5 and 6 have been drawn for one phase only for the sake of clarity. If there are other phases present in a machine, their contributions to the waveforms will be interleaved, as is well understood by the skilled person.

While the above illustrative embodiments have been described with reference to the motoring mode of operation, it will be appreciated that the invention is equally applicable to the generating mode of operation and brings the attendant reductions in capacitor voltage. In this case, the second pulse will generally be the higher of the two (since the current generally rises during freewheeling in generating), so the best strategy is not to overlap the pulses, but to wait until the first has virtually decayed to zero before opening the second switch.

While the above illustrative descriptions have used a particular set of circuit parameters, it will be appreciated that the invention is not necessarily limited to any particular values of phase number, machine topology, components, circuit voltages or machine topology. The only requirement is that the switching circuit for the machine is capable of freewheeling for the chosen predetermined time.

The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A method of reducing the magnitude of transient voltages in a switched reluctance drive system which comprises a reluctance machine having a stator with at least one phase winding and a moving part which is movable in relation to the stator, switch means connected across each phase winding which are configurable into an energizing mode in which the phase winding is energized through the switch means from a supply for a phase conduction period, a freewheeling mode in which there is no applied voltage and current in the winding recirculates, and a de-energizing mode in which the voltage across the at least one phase winding is reversed, and a DC link capacitor connected across the supply side of the switch means, the method comprising:

initiating the energizing mode at the beginning of the phase conduction period of the at least one phase winding;

initiating the freewheeling mode, causing a first transient voltage spike across the capacitor; and initiating the de-energizing mode a predetermined period after initiating the freewheeling mode, causing a second transient voltage spike across the capacitors;

wherein the second transient voltage spike has a magnitude that does not exceed the magnitude of the first transient voltage spike.

2. A method as claimed in claim 1, in which the predetermined period is fixed according to the decay of the first transient voltage spike.

3. A method as claimed in claim 2, in which the predetermined period is fixed to cause the second voltage spike to be of substantially the same magnitude as the first transient voltage spike.

4. A method of reducing the magnitude of transient voltages in a switched reluctance drive system which comprises a reluctance machine having a stator with at least one phase winding and a moving part which is movable in relation to the stator, switch means connected across the or each phase winding which are configurable into an energizing mode in which the phase winding is energized through the switch means from a supply for a phase conduction period, a freewheeling mode in which there is no applied voltage and the current in the winding recirculates, as the voltage across the winding decays, and a de-energizing mode in which the voltage across the at least one phase winding is reversed, and a DC link capacitor connected across the supply side of the switch means, the method comprising:

initiating the energizing mode at the beginning of the phase conduction period of the at least one phase winding;

initiating the freewheeling mode, causing a first transient voltage spike across the capacitor;

initiating the de-energizing mode after initiating the freewheeling mode, causing a second transient voltage spike across the capacitor; and adjusting the period between the first and second transient voltage spikes to balance the magnitude of the second transient voltage spike against the time taken to de-energize the winding.

5. A method as claimed in claim 4, in which the period is adjusted so that the first and second transient voltage spikes are of substantially equal magnitude.

6. A switched reluctance drive system, comprising:

a reluctance machine having a stator with at least one phase winding and a moving part which is movable in relation to the stator;

at least one switch connected across the at least one phase winding, the at least one switch being configurable into an energizing mode in which the phase winding is energized through the at least one switch from a supply for a phase conduction period, a freewheeling mode in which there is no applied voltage and current in the winding recirculates, and a de-energizing mode in which the voltage across the at least one phase winding is reversed; and a DC link capacitor connected across the supply side of the at least one switch;

wherein the energizing mode is initiated at the beginning of the phase conduction period of the at least one phase winding, further wherein initiation of the freewheeling mode causes a first transient voltage spike across the capacitor, and further wherein the de-energizing mode is initiated a predetermined period after the freewheeling mode is initiated, causing a second transient voltage spike across the capacitor;

wherein the second transient voltage spike has a magnitude that does not exceed the magnitude of the first transient voltage spike.

7. A switched reluctance drive system as claimed in claim 6, in which the predetermined period is fixed according to the decay of the first transient voltage spike.

8. A switched reluctance drive system as claimed in claim 7, in which the predetermined period is fixed to cause the second voltage spike to be of substantially the same magnitude as the first transient voltage spike.

9. A switched reluctance drive system, comprising:

a reluctance machine having a stator with at least one phase winding and a moving part which is movable in relation to the stator;

at least one switch connected across the at least one phase winding, the at least one switch being configurable into an energizing mode in which the phase winding is energized through the at least one switch from a supply for a phase conduction period, a freewheeling mode in which there is no applied voltage and current in the winding recirculates, and a de-energizing mode in which the voltage across the at least one phase winding is reversed; and a DC link capacitor connected across the supply side of the at least one switch;

wherein the energizing mode is initiated at the beginning of the phase conduction period of the at least one phase winding, further wherein initiation of the freewheeling mode causes a first transient voltage spike across the capacitor, further wherein the de-energizing mode is initiated after the freewheeling mode is initiated, causing a second transient voltage spike across the capacitor, and further wherein the period between the first and second transient voltage spikes is adjusted to balance the magnitude of the second transient voltage spike against time taken to de-energize the winding.

10. A switched reluctance drive system as claimed in claim 9, in which the period is adjusted so that the first and second transient voltage spikes are of substantially equal magnitude.

11. A method of reducing the magnitude of transient voltages in a switched reluctance drive system which comprises a reluctance machine having a stator with at least one phase winding and a moving part which is movable in relation to the stator, switch means connected across each phase winding which are configurable into an energizing mode in which the phase winding is energized through the switch means from a supply for a phase conduction period, a freewheeling mode in which there is no applied voltage and current in the winding recirculates, and a de-energizing mode in which the voltage across the at least one phase winding is reversed, and a DC link capacitor connected across the supply side of the switch means, the method comprising:

initiating the energizing mode at the beginning of the phase conduction period of the at least one phase winding;

initiating the freewheeling mode, causing a first transient voltage spike across the capacitor; and initiating the de-energizing mode a predetermined period after initiating the freewheeling mode, causing a second transient voltage spike across the capacitor, wherein the predetermined period is fixed according to the decay of the first transient voltage spike.

12. A method as claimed in claim 11, in which the predetermined period is fixed to cause the second voltage spike to be of substantially the same magnitude as the first transient voltage spike.

13. A switched reluctance drive system, comprising:

a reluctance machine having a stator with at least one phase winding and a moving part which is movable in relation to the stator;

at least one switch connected across the at least one phase winding, the at least one switch being configurable into an energizing mode in which the phase winding is energized through the at least one switch from a supply for a phase conduction period, a freewheeling mode in which there is no applied voltage and current in the winding recirculates, and a de-energizing mode in which the voltage across the at least one phase winding is reversed; and a DC link capacitor connected across the supply side of the at least one switch;

wherein the energizing mode is initiated at the beginning of the phase conduction period of the at least one phase winding, further wherein initiation of the freewheeling mode causes a first transient voltage spike across the capacitor, and further wherein the de-energizing mode is initiated a predetermined period after the freewheeling mode is initiated, causing a second transient voltage spike across the capacitor, wherein the predetermined period is fixed according to the decay of the first transient voltage spike.

14. A switched reluctance drive system as claimed in claim 13, wherein the second transient voltage spike has a magnitude that does not exceed the magnitude of the first transient voltage spike.

15. A switched reluctance drive system as claimed in claim 13, in which the predetermined period is fixed to cause the second voltage spike to be of substantially the same magnitude as the first transient voltage spike.

16. A method of reducing the magnitude of transient voltages in a switched reluctance drive system which comprises a reluctance machine having a stator with at least one phase winding and a moving part which is movable in relation to the stator, and switch means connected across each phase winding which are configurable into an energizing mode in which the phase winding is energized through the switch means from a supply for a phase conduction period, a freewheeling mode in which there is no applied voltage and current in the winding recirculates, and a de-energizing mode in which the voltage across the at least one phase winding is reversed, the method comprising:

initiating the energizing mode at the beginning of the phase conduction period of the at least one phase winding;

initiating the freewheeling mode, causing a first transient voltage spike; and initiating the de-energizing mode a predetermined period after initiating the freewheeling mode, causing a second transient voltage spike;

wherein the second transient voltage spike has a magnitude that does not exceed the magnitude of the first transient voltage spike.

17. A method of reducing the magnitude of transient voltages in a switched reluctance drive system which comprises a reluctance machine having a stator with at least one phase winding and a moving part which is movable in relation to the stator, and switch means connected across each phase winding which are configurable into an energizing mode in which the phase winding is energized through the switch means from a supply for a phase conduction period, a freewheeling mode in which there is no applied voltage and the current in the winding recirculates, as the voltage across the winding decays, and a de-energizing mode in which the voltage across the at least one phase winding is reversed, the method comprising:

initiating the energizing mode at the beginning of the phase conduction period of the at least one phase winding;

initiating the freewheeling mode, causing a first transient voltage spike;

initiating the de-energizing mode after initiating the freewheeling mode, causing a second transient voltage spike; and adjusting the period between the first and second transient voltage spikes to balance the magnitude of the second transient voltage spike against the time taken to de-energize the winding.

18. A switched reluctance drive system, comprising:

a reluctance machine having a stator with at least one phase winding and a moving part which is movable in relation to the stator; and at least one switch connected across the at least one phase winding, the at least one switch being configurable into an energizing mode in which the phase winding is energized through the at least one switch from a supply for a phase conduction period, a freewheeling mode in which there is no applied voltage and current in the winding recirculates, and a de-energizing mode in which the voltage across the at least one phase winding is reversed;

wherein the energizing mode is initiated at the beginning of the phase conduction period of the at least one phase winding, further wherein initiation of the freewheeling mode causes a first transient voltage spike, and further wherein the de-energizing mode is initiated a predetermined period after the freewheeling mode is initiated, causing a second transient voltage spike;

wherein the second transient voltage spike has a magnitude that does not exceed the magnitude of the first transient voltage spike.

19. A switched reluctance drive system, comprising:

a reluctance machine having a stator with at least one phase winding and a moving part which is movable in relation to the stator; and at least one switch connected across the at least one phase winding, the at least one switch being configurable into an energizing mode in which the phase winding is energized through the at least one switch from a supply for a phase conduction period, a freewheeling mode in which there is no applied voltage and current in the winding recirculates, and a de-energizing mode in which the voltage across the at least one phase winding is reversed;

wherein the energizing mode is initiated at the beginning of the phase conduction period of the at least one phase winding, further wherein initiation of the freewheeling mode causes a first transient voltage spike, further wherein the de-energizing mode is initiated after the freewheeling mode is initiated, causing a second transient voltage spike, and further wherein the period between the first and second transient voltage spikes is adjusted to balance the magnitude of the second transient voltage spike against time taken to de-energize the winding.

20. A method of reducing the magnitude of transient voltages in a switched reluctance drive system which comprises a reluctance machine having a stator with at least one phase winding and a moving part which is movable in relation to the stator, and switch means connected across each phase winding which are configurable into an energizing mode in which the phase winding is energized through the switch means from a supply for a phase conduction period, a freewheeling mode in which there is no applied voltage and current in the winding recirculates, and a de-energizing mode in which the voltage across the at least one phase winding is reversed, the method comprising:

initiating the energizing mode at the beginning of the phase conduction period of the at least one phase winding;

initiating the freewheeling mode, causing a first transient voltage spike; and initiating the de-energizing mode a predetermined period after initiating the freewheeling mode, causing a second transient voltage spike, wherein the predetermined period is fixed according to the decay of the first transient voltage spike.

21. A switched reluctance drive system, comprising:

a reluctance machine having a stator with at least one phase winding and a moving part which is movable in relation to the stator; and at least one switch connected across the at least one phase winding, the at least one switch being configurable into an energizing mode in which the phase winding is energized through the at least one switch from a supply for a phase conduction period, a freewheeling mode in which there is no applied voltage and current in the winding recirculates, and a de-energizing mode in which the voltage across the at least one phase winding is reversed;

wherein the energizing mode is initiated at the beginning of the phase conduction period of the at least one phase winding, further wherein initiation of the freewheeling mode causes a first transient voltage spike, and further wherein the de-energizing mode is initiated a predetermined period after the freewheeling mode is initiated, causing a second transient voltage spike, wherein the predetermined period is fixed according to the decay of the first transient voltage spike.

* * * * *